United States Patent
Gutschow et al.

(10) Patent No.: US 10,686,588 B2
(45) Date of Patent: Jun. 16, 2020

(54) TWEAK-BASED STRING ENCRYPTION

(71) Applicant: EntIT Software LLC, Sunnyvale, CA (US)

(72) Inventors: Leslie C. Gutschow, Tallahassee, FL (US); Richard Minner, Sunnyvale, CA (US); Terence Spies, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 91 days.

(21) Appl. No.: 15/693,327

(22) Filed: Aug. 31, 2017

(65) Prior Publication Data

US 2019/0068358 A1 Feb. 28, 2019

(51) Int. Cl.
*H04L 9/06* (2006.01)
*H04L 9/14* (2006.01)
*G06F 16/245* (2019.01)

(52) U.S. Cl.
CPC .......... *H04L 9/0631* (2013.01); *G06F 16/245* (2019.01); *H04L 9/065* (2013.01); *H04L 9/0643* (2013.01); *H04L 9/14* (2013.01); *H04L 2209/38* (2013.01)

(58) Field of Classification Search
CPC ....... H04L 9/0631; H04L 9/0643; H04L 9/14; G06F 16/245
See application file for complete search history.

(56) References Cited

U.S. PATENT DOCUMENTS

| | | | |
|---|---|---|---|
| 9,558,241 B2 | 1/2017 | Harris et al. | |
| 9,679,155 B1 * | 6/2017 | Grubbs | G06F 21/6227 |
| 2008/0170693 A1 * | 7/2008 | Spies | G06F 21/6209 |
| | | | 380/277 |

OTHER PUBLICATIONS

Leontiadis et al., Storage Efficient Substring Searchable Symmetric Encryption, 2016 (23 pages).
Liskov et al., Tweakable Block Ciphers, 2011 (16 pages).
Strizhov et al., Substring Position Search over Encrypted Cloud Data using Tree-based Index, Mar. 2015 (10 pages).
Terence Spies, Format Preserving Encryption, 2013 (8 pages).
Xiao et al., Security Analysis and Enhancement for Prefix-Preserving Encryption Schemes, 2012 (19 pages).
Xu et al., Prefix-Preserving IP Address Anonymization: Measurement-based Security Evaluation and a New Cryptography-based Scheme, Aug. 2002 (29 pages).

* cited by examiner

*Primary Examiner* — Olugbenga O Idowu

(57) ABSTRACT

A technique includes performing element-by-element encryption of a segment of the plaintext string to provide a segment of an encrypted string. Performing the element-by-element encryption includes, for a given string element of the segment of the plaintext string, encrypting the given string element to provide a given string element of the segment of the encrypted string; and tweaking the encryption of the given string element based on a selector that includes multiple string elements of the encrypted string. The technique may include searching an encrypted database based on the encrypted string.

19 Claims, 7 Drawing Sheets

TWEAK-BASED STRING ENCRYPTION

BACKGROUND

For purposes of protecting sensitive data (data representing social security numbers, salaries, account information, and so forth) that is stored in a database from unauthorized access, the data may be encrypted. For example, the database may be a relational database that contains tables; and various aspects of the tables may be encrypted, such as schema keys and/or data fields of the tables. Encrypting the data in the database, however, may impose constraints on database-related functions. For example, it may be challenging due to the encryption to search the database for certain strings (a particular employee name, information pertaining to a particular department, and so forth).

DETAILED DESCRIPTION

Figure 1:
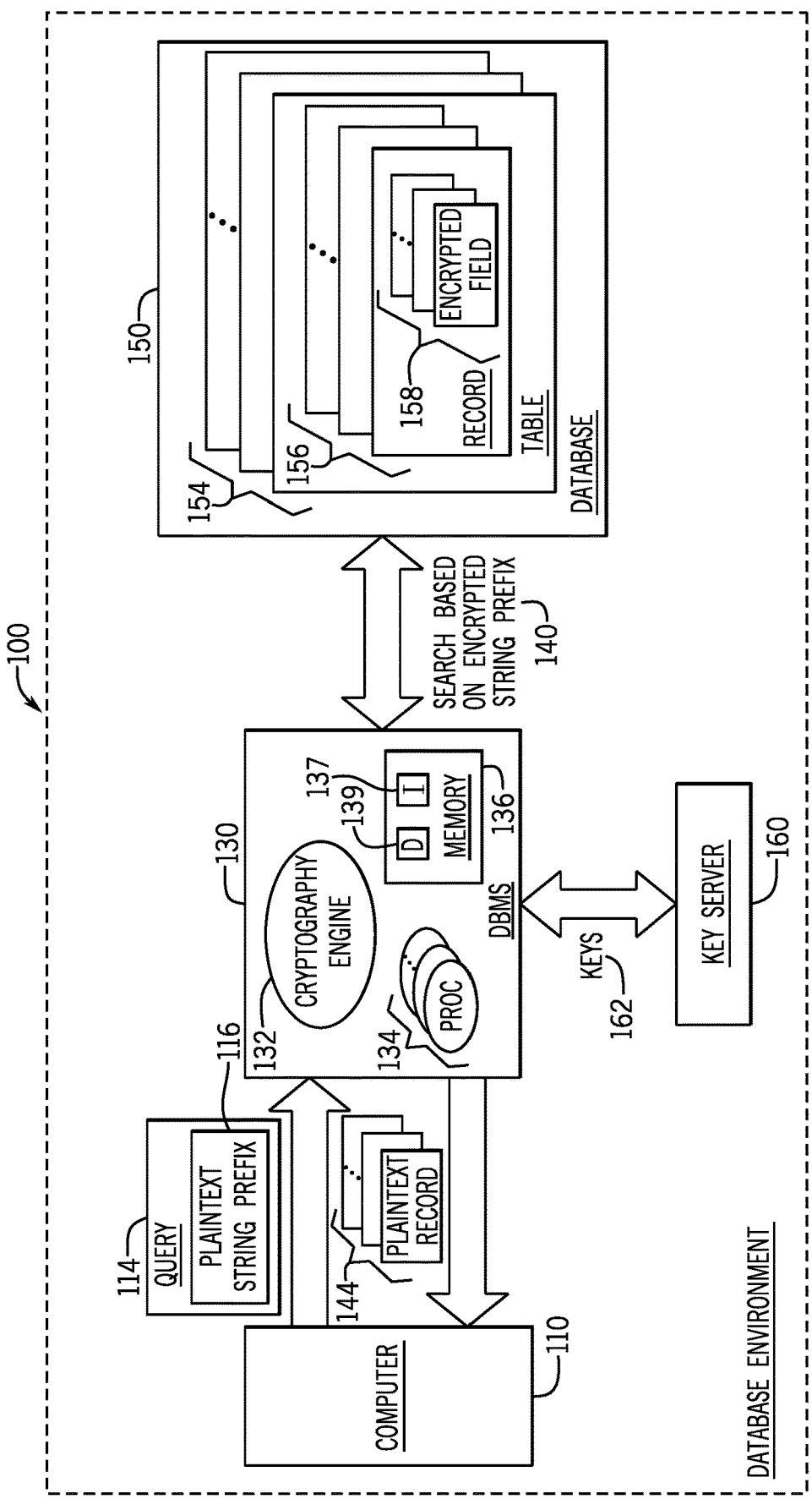
FIG. 1 is a schematic diagram of a database environment according to an example implementation.

The data that is stored in a database may be encrypted for purposes of protecting confidential information from unauthorized access. For example, the database may be a relational database that contains tables, and the data fields of records (rows, for example) of the tables may be encrypted. Due to the encryption, it may be challenging to search for a particular string or string prefix contained in the database. In this context, a "string" refers to an ordered sequence, or one dimensional array, of elements (characters, binary values, integers, and so forth). For example, "Stephanie" is a string of nine characters. A "prefix" (also called a "prefix string" herein), in general, is also a string and may refer to the initial part, or segment, of a larger string. As such, a prefix is a subgroup of elements of a larger string, beginning with element number one of the larger string. As examples, "Step," "Ste" and "Steph" are prefixes of the string "Stephanie."

An authorized database user may search a database to, for example, retrieve records pertaining to a certain employee name ("Stephanie," for example). For this purpose, the user may formulate and submit a query to retrieve records (rows, for example) from the database pertaining to employee names containing the name "Stephanie." Alternatively, to perform a more inclusive search, the database user may use a shorter segment, or prefix, of "Stephanie," such as "step" (where for the following examples, it is assumed the search is case invariant). In this regard, the user may first submit a query using "step" to retrieve a list of names that include either "step" either in the first four characters of the entire name or in other parts of the field. The user may then use this list to find the specific row or rows in a table with names containing "Stephanie" and variants thereof.

The string "Stephanie" and the prefix "step," used in the examples above are examples of plaintext. In this context, "plaintext" refers to information that is unencrypted. The plaintext data may be encrypted to produce encrypted data, or ciphertext; and the ciphertext may be decrypted in a reversible process to produce the plaintext data. For example, a plaintext character string refers to the plain, or ordinary, meaning of the string. For an encrypted database, such as a database in which the data fields are encrypted, searching for strings and prefixes may be relatively more challenging. Searching for the encrypted version of "Stephanie" or "step" may return relatively few, if any, results. In this manner, depending on the encryption used, a pair of ciphertext strings may be entirely different, although the corresponding plaintext strings may slightly differ and may contain similar substrings.

One solution to search an encrypted database is to decrypt all of the data fields of a particular table or tables before doing a search on the table(s) using a given prefix. Although such an approach may be advantageous for relatively small tables, the approach may not be practical for relatively large tables that may have, for example, millions of records (rows). Another solution to search an encrypted database may be to encrypt the entire search string (corresponding to a string size of the data field) and search for data fields containing this encrypted string. However, this approach does not allow a user to perform partial string, or prefix, searches.

In accordance with example implementations that are described herein, the data fields of a database are encrypted using format preserving encryption (FPE). In this context, FPE refers to a type of encryption in which the format of the plaintext data is the same as the format of the encrypted data. For example, for a string, the FPE preserves the format of a plaintext string (or plaintext prefix) so that the plaintext string (or plaintext prefix) has the same number of characters as the corresponding ciphertext string (or prefix).

In accordance with example implementations, a plaintext prefix may be encrypted using FPE to generate a corresponding ciphertext prefix, and the ciphertext prefix may then be used to search for records in the encrypted database. Thus, users may be able to search a table of the encrypted database using a partial string, or prefix, starting from a beginning character or characters (as an example) of a particular string. For the example given above, a user may search for the prefix "step" of the string "Stephanie" using an FPE-based encrypted prefix.

Referring to FIG. 1, in accordance with example implementations, a database environment 100 includes a database management system (DBMS) 130, which includes a prefix preserving cryptography engine 132. In accordance with example implementations, the cryptography engine is constructed to generate FPE-based encrypted prefixes (also referred to as "ciphertext prefixes" herein) for searches 140 that are performed on an encrypted database 150. In this manner, the database 150 may be, for example, a relational database, which contains tables 154, and records 156 (rows, for example) of the tables 154 may include encrypted data fields 158.

More specifically, the cryptography engine 132 may, for example, generate a ciphertext prefix in response to a query 114 that may be submitted by a database user (a user of a computer 110, for this example). In this manner, the query 114 may contain one or multiple plaintext string prefixes 116, or strings, to be searched on the database 150; and the cryptography engine 132 may generate one or multiple corresponding ciphertext prefixes to search for records 156 of the database 150 that contain the ciphertext prefixes. As a result of this search, the cryptography engine 132 may decrypt the records 156 retrieved due to the search, and the DBMS 130 may provide one or multiple corresponding plaintext records 144 back to the users of the computer 110. The encryption and decryption by the cryptography engine 132 may involve using keys 162 that may be provided by a key server 160, as further described herein.

It is noted that the database environment 100 is one out of many possible architectures that may employ FPE-based prefix encryption, as described herein. Other architectures are contemplated and are within the scope of the appended claims. For example, in accordance with further example implementations, the cryptography engine 132 may be part of the computer 110, and the computer 110 may correspondingly use encrypted string prefixes to access the database 150.

For the specific example of FIG. 1, the DBMS 130 includes one or multiple actual, physical machines that include actual hardware, such as one or multiple processors 134 (one or multiple central processing units (CPUs), one or multiple CPU cores, and so forth) and a memory 136. The DBMS 130 may include components (server blades, for example) disposed on the same rack or on different racks. Moreover, the DBMS 130 may include components that may be disposed at a single geographical location or may be disposed at multiple geographical locations. The memory is a non-transitory storage media and may be formed from semiconductor storage devices, non-volatile memory devices, volatile memory devices, phase change memory devices, memristors, one or more of the foregoing memory technologies, other memory technologies, and so forth.

In accordance with example implementations, the processors 134 may execute machine executable instructions 137 (or "software"), which may be stored in the memory 136. In this manner, in accordance with some implementations, the cryptography engine 132 may be formed from a set of machine executable instructions 137 that are executed by one or multiple processors 134. The memory 136 may also store data 139, such as data that represents unencrypted, or plaintext data; encrypted, or ciphertext data; keys; variables; data structures; preliminary, intermediate or final processing results that are described herein; and so forth.

In accordance with some implementations, the cryptography engine 132 may be formed from a group, or library, of application programming interfaces (APIs), which provide prefix encryption and decryption functions. For example, in accordance with some implementations, the cryptography engine 132 may provide the following three APIs:

Encrypt(K, S)->C;
Decrypt(K, C)->S, and
EncryptPrefix(K, P)->EP, where "K" represents a key; "S" represents a plaintext string; "C" represents a ciphertext string; "P" represents a plaintext prefix; and "EP" represents an encrypted, or ciphertext, prefix.

The encrypted prefix EP allows matching in the encrypted domain. As examples, the above three APIs may perform the following functions with the string "EXAMPLE" and prefix "EXA":

Encrypt(K, "EXAMPLE")->"QRRMOFY"
Decrypt(K, "QRRMOFY")->"EXAMPLE"
EncryptPrefix(K, "EXA")->"QRR"

It is noted that, as illustrated above, in accordance with example implementations, the encryption preserves the prefix. In this manner, "EXAMPLE" encrypts to "QRRMOFY," and the first three characters of "EXAMPLE" encrypts to the first three letters of "QRRMOFY," or "QRR."

In accordance with further example implementations, the cryptography engine 132 may not include a library, such as a library containing the above-mentioned APIs. Moreover, in accordance with yet further example implementations, the cryptography engine 132 may be hardware-based, which does not involve processor-based machine executable instruction execution. For example, in accordance with further implementations, the cryptography engine 132 may be a field programmable gate array (FPGA), an application specific integrated circuit (ASIC), and so forth.

Regardless of its particular form, the cryptography engine 132, in accordance with example implementations, is constructed to encrypt a plaintext string (or any portion thereof) using a tweak-based format preserving encryption and decrypt a ciphertext string using a corresponding tweak-based format preserving decryption. Moreover, as described herein, in accordance with example implementations, the encryption/decryption may include an element-by-element encryption/decryption; may include a multiple element-by-element encryption/decryption; and may involve the use of a key chain, or ladder.

Figure 2:
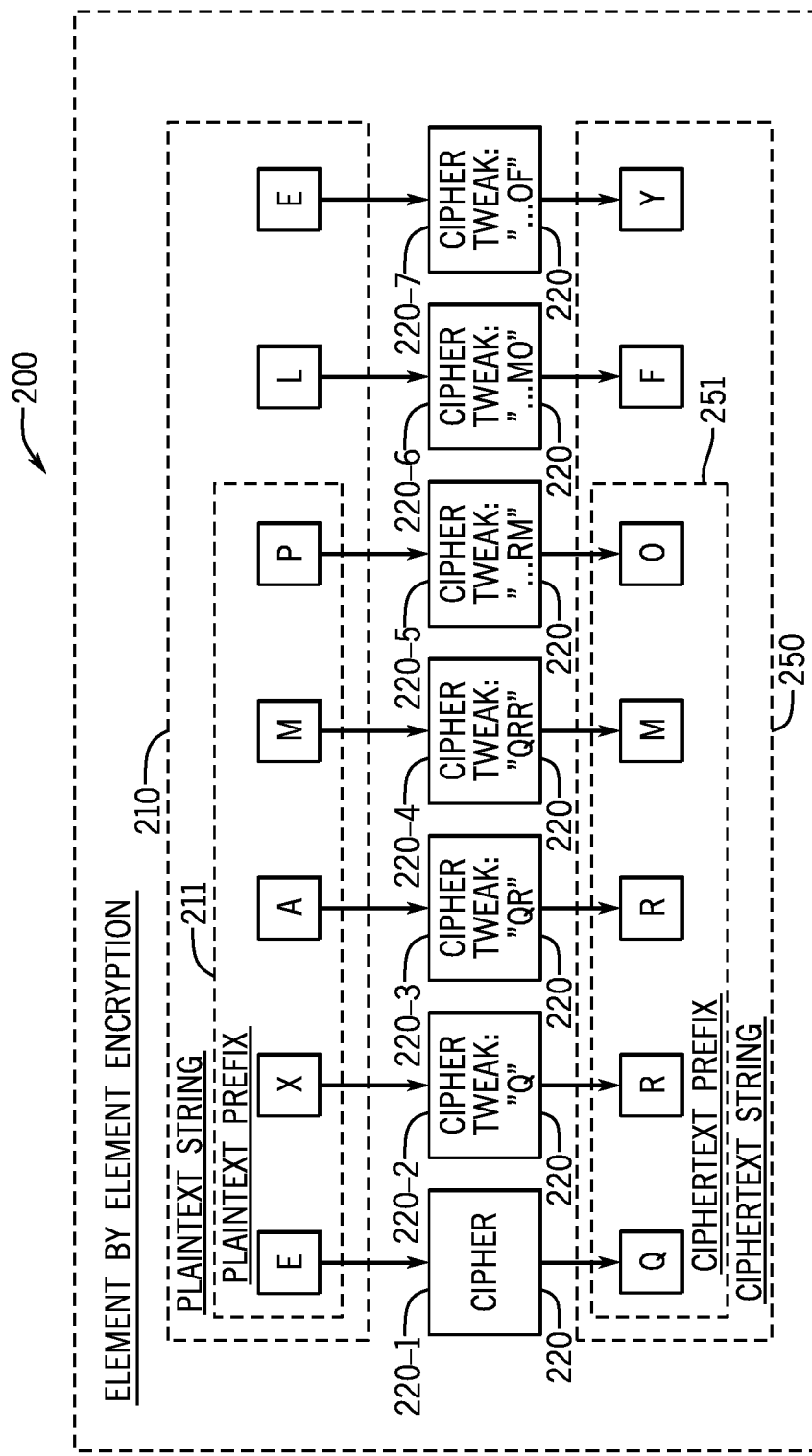
FIG. 2 is an illustration of format preserving encryption (FPE) of a string using element-by-element encryption and encryption tweaking according to an example implementation.

FIG. 2 illustrates an element-by-element prefix encryption 200 that may be used by the cryptography engine 132 according to an example implementation. For this example, a plaintext string 210, here, "EXAMPLE," may be encrypted to provide a corresponding ciphertext string 250, here, "QRRMOFY." Moreover, the element-by-element encryption 200 may be used to encrypt any initial segment, or prefix, of the plaintext string 210, such as example plaintext prefix "EXAMP" 211, which corresponds to ciphertext prefix "QRRMO" 251. In this manner, a database user may perform a task in which the database 150 (FIG. 1) is searched using the prefix 211. As depicted in FIG. 2, the ciphertext prefix 251 has the same number of characters (i.e., the same prefix length) as the corresponding plaintext prefix 211. In FIG. 2, the prefix length is five, although the prefix length may be longer or shorter than five.

In accordance with example implementations, each element of the plaintext string 210 may be encrypted by applying a corresponding encryption algorithm, or cipher 220 (an Advanced Encryption Standard (AES) block cipher having a 256 bit block size, as an example), to the element. In this manner, FIG. 2 depicts the application of ciphers 220-1, 220-2 . . . 220-7 to corresponding elements of the plaintext string 210. In general, the elements of the ciphertext string 250 are generated in an ordered sequence, corresponding to the ordered sequence of the elements of the plaintext string 210. In this manner, beginning with the first element ("E") of the plaintext string 210, the cipher 220-1 is applied to generate the first element ("Q") of the ciphertext string 250; next, the cipher 220-2 is applied to the second element ("X") of the plaintext string 210 to generate the second element ("R") of the ciphertext string 250; subsequently, the cipher 220-3 is applied to the third element ("A") of the plaintext string 210 to generate the third element ("R") of the ciphertext string 250; and so forth. In accordance with example implementations, although the same basic cipher 220 may be applied to each plaintext string element, for a given plaintext string element, the cipher 220 that is applied to the element is altered, or "tweaked," based on the portion of the ciphertext string 250 that has already been generated.

In the context of this application, the "tweaking" of a cipher refers to the modification of the cipher based on a tweak input, or selector. For example, in accordance with some implementations, the cipher 220 may be a block cipher; and a key is used as an index to select a certain permutation (of a plurality of potential permutations) of the block cipher (used for encryption or decryption). The tweak input, or selector, may be an additional index that is used to select the permutation of the block cipher. In other words, in accordance with example implementations, the combination of the key and the tweak form an index that selects the permutation for the block cipher. Unlike the key, the tweak may not be secret. Instead, as described herein, the tweak selector for a given cipher 220 may be formed from one or multiple characters of the ciphertext string 250.

More specifically, in accordance with example implementations, the tweak input, or selector, for a given cipher 220 is the string of element(s) of the part of the ciphertext string 250 that has already been generated. For the application of the cipher 220-1 to the first element of the plaintext string 210, there are no previously generated ciphertext elements. Therefore, in accordance with example implementations, no tweaking occurs in the application of the cipher 220-1. In other words, the encrypted character "Q" is generated based on a key, the input "E" and the cipher 220-1. The tweaking begins with the generation of the second element of the ciphertext string 250, in accordance with example implementations. In this manner, the second element ("X") of the plaintext string 210, is encrypted by applying the cipher 220-2 and tweaking the cipher 220-2 using a tweaking selector formed from the portion of the ciphertext string 250, which had been generated (here, "Q"). As such, the cipher 220-2 is tweaked by "Q," and in conjunction with a key, a permutation of the cipher 220-2 is selected to encrypt "X" to produce a corresponding element ("R") of the ciphertext string 250.

In a similar manner, the third element ("A") of the plaintext string 210, "A," is encrypted by a cipher 220-3 that is tweaked by "QR." The encryption of the plaintext string 210 may continue in a similar element-by-element fashion, such that, for the last element ("E") of the plaintext string 210, the "E" is encrypted by a cipher 220-7 that is tweaked by "QRRMOF" to produce the last element ("Y") of the ciphertext string 250.

In accordance with example implementations, the element-by-element prefix encryption 200 may performed by a processor 134 (FIG. 1) repeatedly executing a set of machine executable instructions for each plaintext character to be encrypted. In this manner, each time the processor 134 executes the set of instructions, the processor 134 may, for each plaintext element to be encrypted, tweak a cipher based on the already (if any) generated elements of the ciphertext prefix, and encrypt the element using the tweaked cipher.

It is noted that although FIG. 2 depicts encryption, an element-by-element decryption may be applied in a similar manner to generate an arbitrary length plaintext string from a ciphertext string of the same length. The decryption proceeds in the opposite direction along the string relative to the encryption. For example, to decrypt the ciphertext prefix 251, the last element ("O") of the ciphertext prefix 251, is decrypted by tweaking a cipher based on the first four elements ("QRRM") of the prefix 251 and applying the tweaked cipher to generate the last element ("P") of the prefix 211); the fourth element ("M") of the ciphertext prefix 251, is decrypted by tweaking a cipher based on the first three elements ("QRR") of the prefix 251 and applying the tweaked cipher to generate the fourth element ("M") of the prefix 211; and so forth.

Figure 3:
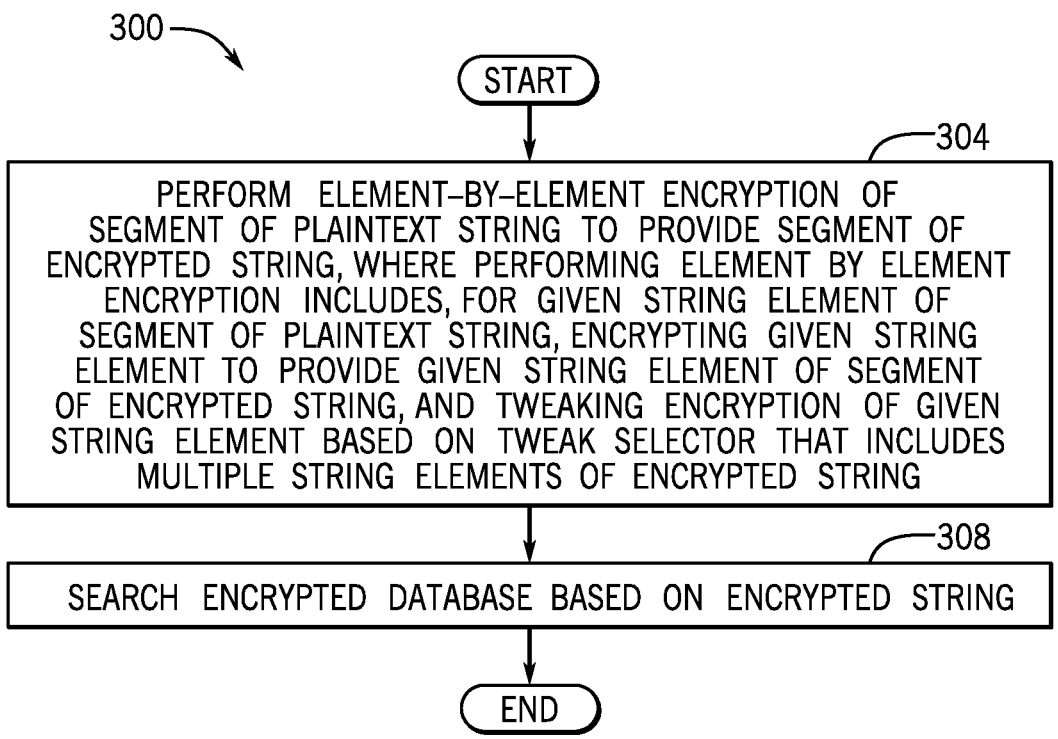
FIG. 3 is a flow diagram depicting a tweak-based encryption technique to generate an encrypted string prefix according to an example implementation.

Thus, referring to FIG. 3, in accordance with example implementations, a technique 300 may be used to encrypt a plaintext string. The technique 300 includes, pursuant to block 304, performing element-by-element encryption of a segment of the plaintext string to provide a segment of an encrypted string. Performing the element-by-element encryption includes, for a given string element of the segment of the plaintext string, encrypting the given string element to provide a given string element of the segment of the encrypted string; and tweaking the encryption of the given string element based on a selector that includes multiple string elements of the encrypted string. The technique includes searching an encrypted database based on the encrypted string, pursuant to block 308.

An encryption, such as the encryption 200 of FIG. 2, which encrypts the first element of a plaintext string to the same ciphertext element value (the same character for a character string, for example), regardless of the other elements of the plaintext string, may be susceptible to a security attack called a "dictionary attack." In this manner, knowledge that the first element of a plaintext string encrypts to a given ciphertext element value may be used to search and sort encrypted data with some degree of granularity. For example, if the first plaintext element of a string is "E" and the corresponding first ciphertext element is "Q," then an attacker may glean that all ciphertexts starting with "Q" actually start with the plaintext "E."

Figure 4:
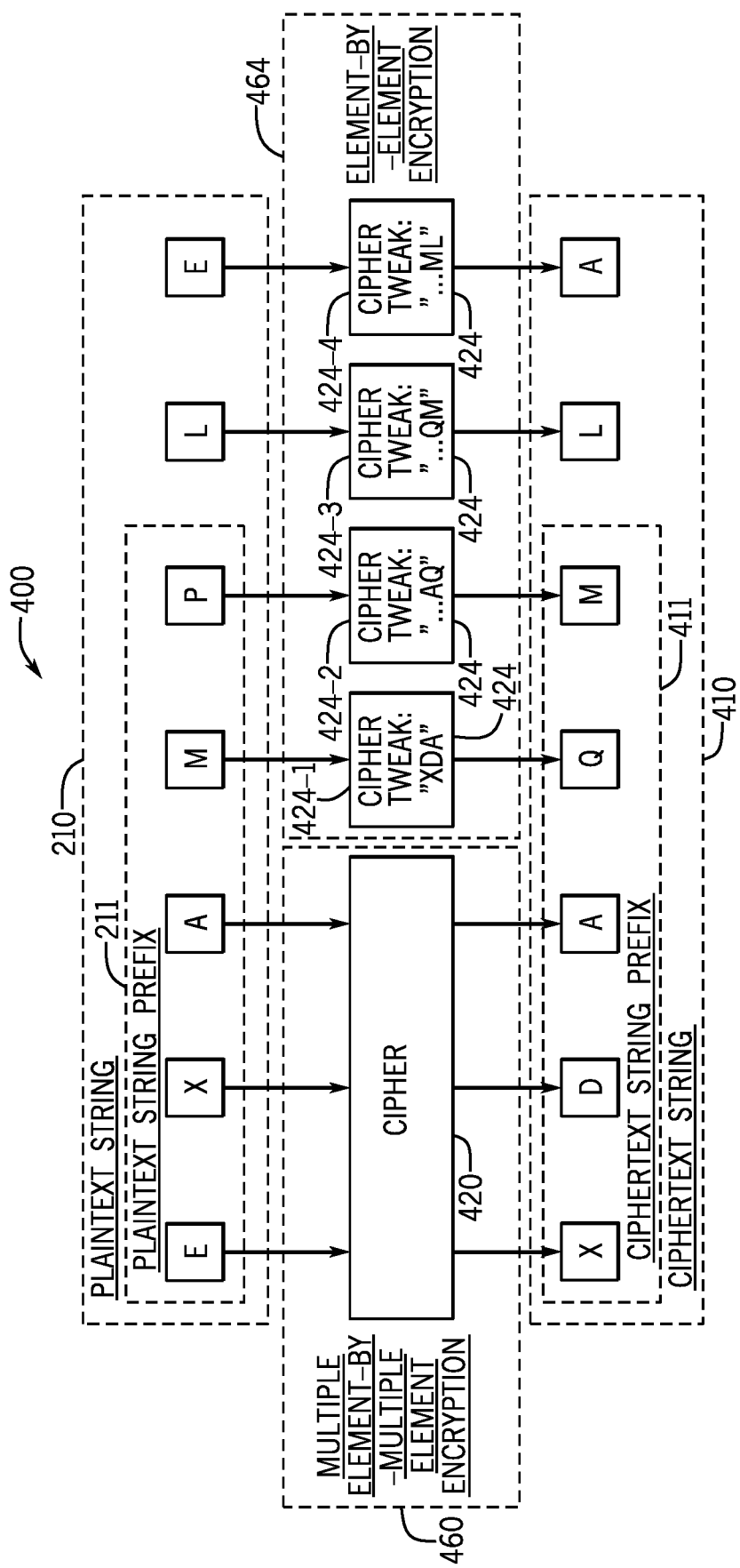
FIG. 4 is an illustration of FPE of a string using multiple element-by-multiple element encryption, element-by-element encryption, and encryption tweaking according to an example implementation.

Referring to FIG. 4, to inhibit such a dictionary attack, in accordance with further example implementations, the cryptography engine 132 (FIG. 1) may apply an FPE-based encryption 400, in which a multiple element-by-multiple element encryption 460 is applied to the lower order elements of the plaintext string 210 (elements one to three for example) and element-by-element encryption 464 is applied to the higher order elements of the plaintext string 210 (elements four and higher, for example).

More specifically, FIG. 4 depicts encryption of the plaintext string 210 to generate a ciphertext string 410. A segment of the plaintext string 210, such as example plaintext prefix 211, may be encrypted to produce a corresponding segment of the ciphertext string 410, such as example ciphertext prefix 411. For the multiple element-by-multiple element encryption 460, the first three elements ("EXA") of the plaintext string 210 are encrypted by an FPE-based multiple element cipher 420 to provide three corresponding elements ("XDA") of the ciphertext string 410. As an example, the cipher 420 may be a block cipher (a 65,536 bit block cipher, for example). Therefore, by grouping multiple elements together, a dictionary attack may be avoided in that, for example, the first plaintext element "E" does not necessarily encrypt to the first element "X" of the ciphertext string 410, but rather, the value for the first ciphertext element depends on the first three plaintext elements.

The remaining elements (elements four and above) of the plaintext string 210, in accordance with example implementations, are encrypted using the element-by-element encryption 464, as described above. In this regard, FIG. 4 depicts ciphers 420 (ciphers 424-1, 424-2, 424-3, and 424-4), which are tweaked by the corresponding parts of the ciphertext string 410 already generated. For example, "M" is provided to cipher 424-1, which is tweaked based on "XDA" to provide a corresponding element "Q."

It is noted that although FIG. 4 depicts encryption, the decryption may be applied in a similar manner to generate an arbitrary length plaintext string from a ciphertext string of the same length. The decryption proceeds in the opposite direction along the string relative to the encryption.

In accordance with example implementations, the cryptography engine 132 (FIG. 1) may place a limit on the length of the prefix to be searched. For example, referring to FIG. 4, the length may be limited to five, thereby limiting the ciphertext prefix string 211 to "XDAQM" and thereby not allowing a search of prefixes greater than five elements).

In accordance with some implementations, the length of the prefix string may be regulated using a key chain, or ladder. In this manner, referring to FIG. 1, the cryptography engine 132 may receive a key 162 (from a key server 160, for example) and apply a hash function to the key 162 to generate a chain, or ladder, of keys to be used in the prefix encryption. In this manner, a ladder of keys may be created using a hash function as follows:

$$K_{L-1}=H(K), K_{L-2}=H(K_{L-1}), K_{L-3}=H(K_{L-2}), \ldots, K_0=H(K_1),$$

where "H( )" represents the hash function; "K" represents the key received from the key server; and "$K_{L-1}$," "$K_{L-2}$," "$K_{L-3}$," . . . "$K_1$," and "$K_0$" represent the keys that are generated by applying the hash function H( ) and are provided to corresponding ciphers; and "L" represents the maximum prefix length. By providing the key $K_x$, X+1 elements of the prefix may be decrypted, but no more keys may be derived. For example, the keys $K_{X-1}$, $K_{X-2}$, $K_{X-3}$, etc. may be generated by hashing, starting with applying the hash function to the $K_x$, but the key $K_{X+1}$ may not be recovered.

Figure 5:
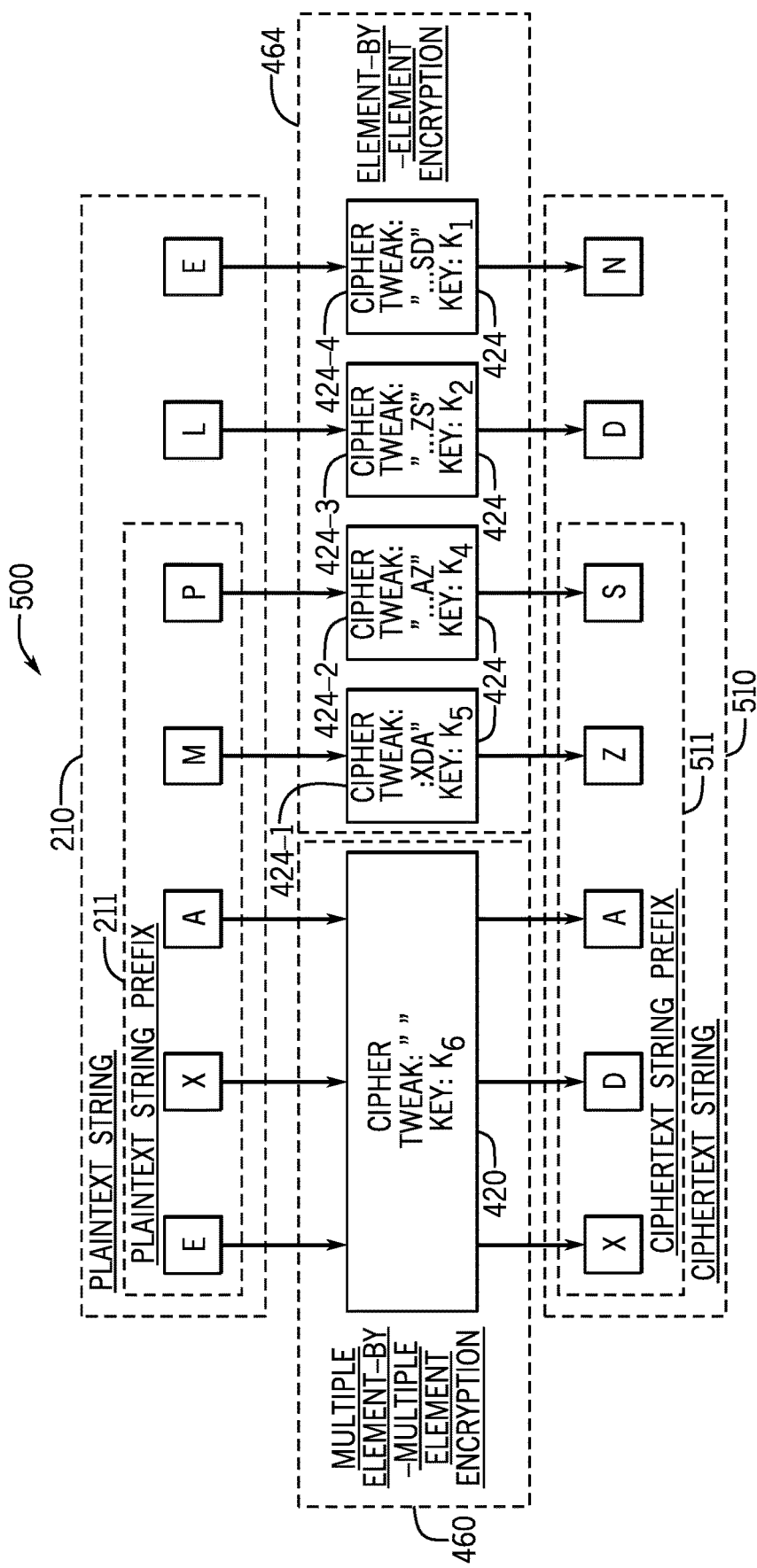
FIG. 5 is an illustration of FPE of a string using multiple element-by-multiple element encryption, element-by-element encryption, encryption tweaking, and keys associated with a key chain according to an example implementation.

The above-described key chain may be used in conjunction with an FPE encryption 500 illustrated in FIG. 5, in accordance with example implementations. In general, the encryption 500 is similar to the encryption 400 of FIG. 4, with like reference numerals being used to denote similar components. In FIG. 5, however, the encryption 500 uses keys (such as the five depicted keys $K_6$, $K_5$, $K_4$, $K_2$ and $K_1$) that are derived from a key chain. In general, FIG. 5 depicts encryption of the plaintext string 210 to generate a ciphertext string 510. A segment of the plaintext string 210, such as example plaintext prefix 211, may be encrypted to produce a corresponding segment of the ciphertext string 510, such as example ciphertext prefix 511. As described below, the key chain may be used to control the length of the plaintext 211 prefix that may be encrypted and used.

The multiple element-by-multiple element cipher 420 encrypts based on a key $K_6$, and the tweakable ciphers 424-1, 424-2, 424-3 and 424-4 encrypt based on keys $K_5$, $K_4$, $K_2$ and $K_1$, respectively. As depicted in FIG. 5, when multiple element-by-multiple element encryption is used to encrypt the initial three elements of the prefix, the maximum length of the prefix is controlled by a number of keys available from the key chain, which is two less than the maximum length (to account for the element grouping); and the key $K_3$ (or another key) may not be used. Thus, as examples, for a maximum prefix length of seven, five keys are used, as depicted in FIG. 5; for a maximum prefix length of five, three keys (keys $K_4$, $K_2$ and $K_1$) are used; and so forth.

It is noted that although FIG. 5 depicts encryption, the decryption may be applied in a similar manner to generate an arbitrary length plaintext string from a ciphertext string of the same length. The decryption proceeds in the opposite direction along the string relative to the encryption.

The key chain may be used for the encryption 200 of FIG. 2, in accordance with further example implementations. For these implementations, the number of keys available from the key chain controls the maximum prefix length. As an example, for a maximum prefix length of five, keys $K_4$, $K_3$, $K_2$ and $K_1$ may be used by the ciphers 220-1, 220-2, 220-3, 220-4 and 220-5, respectively.

Figure 6:
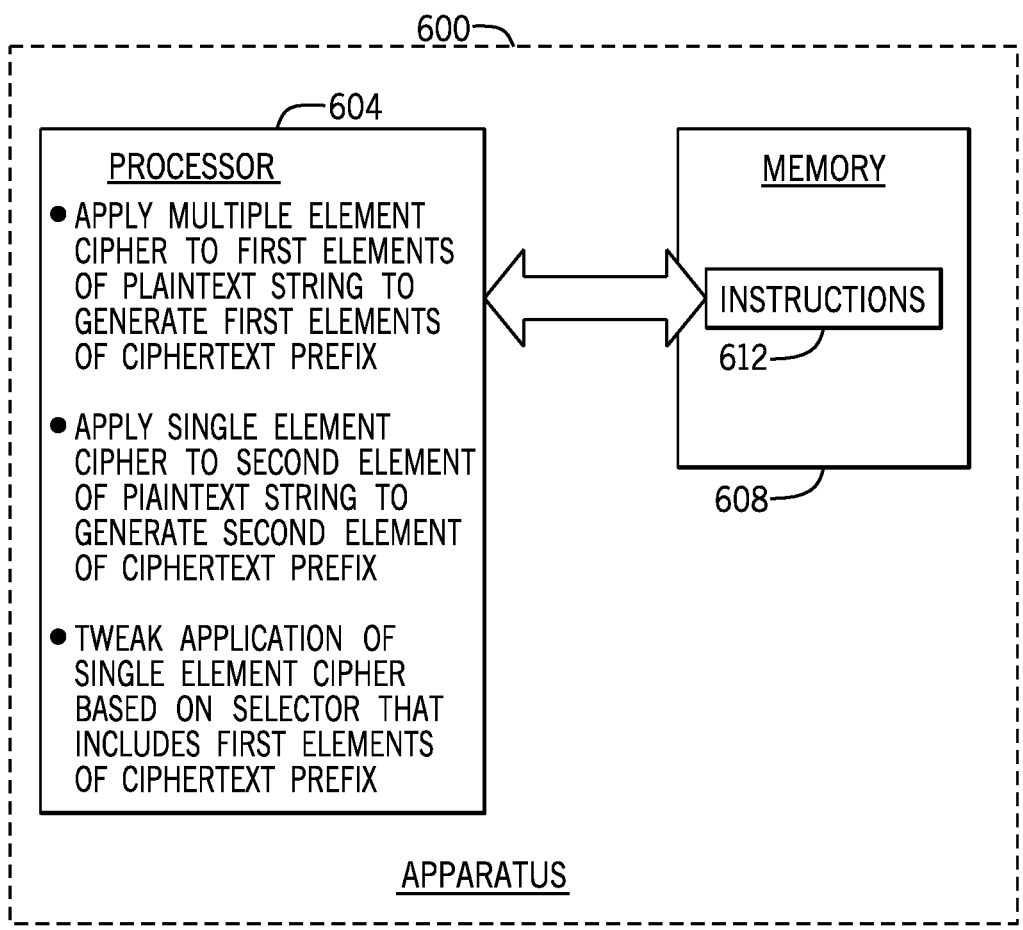
FIG. 6 is a schematic diagram of an apparatus to provide an encrypted prefix according to an example implementation.

Referring to FIG. 6, in accordance with example implementations, an apparatus 600 includes a processor 604 and a memory 608. The memory 608 stores instructions 612 that, when executed by the processor 604, cause the processor 604 to apply a multiple element cipher to first elements of a plaintext string to generate first elements of a ciphertext prefix; apply a single element cipher to a second element of the plaintext string to generate a second element of the ciphertext prefix; and tweak the application of the single element cipher based on a selector that includes the first elements of the ciphertext prefix.

Figure 7:
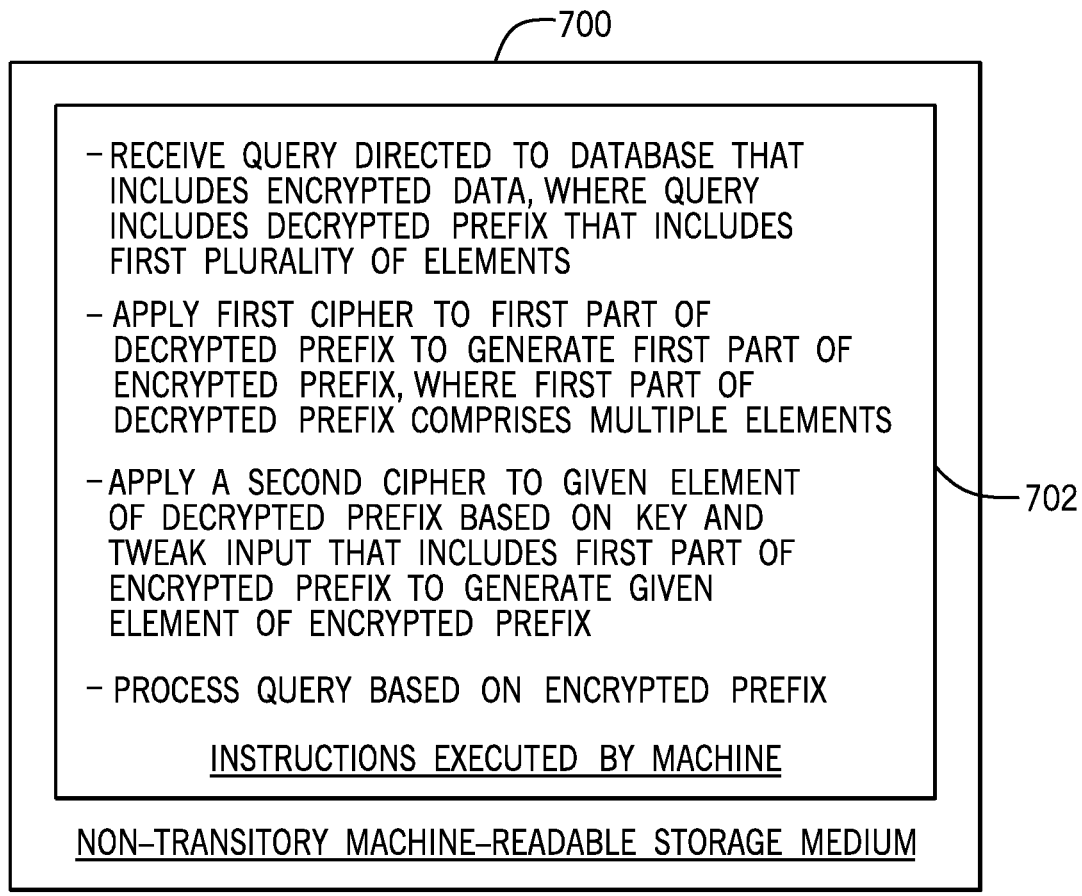
FIG. 7 is an illustration of a non-transitory computer-readable storage medium storing instructions that, when executed by a machine, cause the machine to generate an encrypted string prefix according to an example implementation.

More specifically, referring to FIG. 7, in accordance with example implementations, a non-transitory machine readable storage medium 700 stores instructions 702 that, when executed by a machine, cause the machine to receive a query that is directed to a database that includes encrypted data. The query includes a decrypted prefix that includes a first plurality of elements. The instructions 702, when executed by the machine, cause the machine to apply a first cipher to a first part of the decrypted prefix to generate a first part of an encrypted prefix, where the first part of the decrypted prefix includes multiple elements; and apply a second cipher to a given element of the decrypted prefix based on a key and a tweak input that includes the first part of the encrypted prefix to generate a given element of the encrypted prefix. The instructions 702, when executed by the machine, cause the machine to process the query based on the encrypted prefix.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

for a plaintext string comprising a plurality of string elements, performing element-by-element encryption of a given segment of the plaintext string to provide a segment of an encrypted string comprising a plurality of ciphertext string elements, wherein performing the element-by-element encryption comprises for a given string element of the given segment of the plaintext string:

encrypting the given string element to provide a given string element of the segment of the encrypted string, wherein encrypting the given string element comprises:

combining multiple ciphertext string elements of the plurality of ciphertext string elements to form a string of the multiple ciphertext string elements representing a tweak index;

combining the tweak index and a key to form a second index;
selecting a permutation of a block cipher based on the second index; and
encrypting the given string element based on the second index; and
using the encrypted string to search an encrypted database.

2. The method of claim 1, further comprising:
performing multiple element by multiple element encryption of another segment of the plaintext string to provide another segment of the encrypted string,
wherein the tweak index comprises the another segment.

3. The method of claim 2, wherein:
performing the element-by-element encryption comprises repeatedly applying a first block cipher associated with a first block size; and
performing the multiple element by multiple element encryption comprises applying a second block cipher associated with a second block size larger than the first block size.

4. The method of claim 1, further comprising generating a chain of keys based on a hash and another key, wherein performing the element-by-element encryption comprises performing the element-by-element encryption based on the chain of keys.

5. The method of claim 1, wherein the tweak index preserves an ordering of the multiple ciphertext string elements in the encrypted string.

6. The method of claim 1, wherein performing the element-by-element encryption further comprises:
encrypting another element of the segment of the plaintext string to provide another ciphertext element of the encrypted string; and
tweaking the encryption of the another ciphertext element based on another tweak index comprising a string comprising the given string element and the multiple ciphertext string elements of the encrypted string.

7. The method of claim 1, wherein the plurality of string elements of the plaintext string represent characters.

8. An apparatus comprising:
a processor; and
a memory to store instructions that, when executed by the processor, cause the processor to:
apply a multiple element cipher to first elements of a plurality of elements of a plaintext string to generate first elements of a ciphertext prefix;
encrypt a second element of the plurality of elements of the plaintext string to generate a second element of the ciphertext prefix, wherein encrypting the second element of the plurality of elements of the plaintext string comprises:
combining multiple elements of the first elements of the ciphertext prefix to form a string of the multiple elements representing a tweak index;
combining the tweak index and a key to form a second index;
selecting a permutation of a block cipher based on the second index; and
encrypting the second element based on the second index.

9. The apparatus of claim 8, wherein:
the instructions, when executed by the processor, cause the processor to repeatedly apply the block cipher to an output string corresponding to the ciphertext prefix as the ciphertext prefix is being generated;
the output string has a length that increases with each application of the block cipher; and
the string of multiple elements representing the tweak index further comprises the output string.

10. The apparatus of claim 8, wherein the instructions, when executed by the processor, cause the processor to apply format preserving encryption to the plaintext string to generate the ciphertext prefix.

11. The apparatus of claim 8, wherein the instructions, when executed by the processor, cause the processor to query a database based on the ciphertext prefix.

12. The apparatus of claim 8, wherein the instructions, when executed by the processor, cause the processor to limit a length of the ciphertext prefix.

13. The apparatus of claim 8, wherein the instructions, when executed by the processor, cause the processor to:
apply a first key of a plurality of keys in the application of the multiple element cipher, wherein the plurality of keys comprises a second key other than the first key, wherein combining the tweak index and the key to form the second index comprises combining the tweak index and the second key to form a second index.

14. The apparatus of claim 13, wherein the instructions, when executed by the processor, cause the processor to receive a key from a key server and apply a hash function to generate the plurality of keys from the received key.

15. A non-transitory machine readable storage medium to store instructions that, when executed by a machine, cause the machine to:
receive a query directed to a database comprising encrypted data, wherein the query comprises a decrypted prefix comprising a first plurality of elements;
apply a first cipher to a first part of the decrypted prefix to generate a first part of an encrypted prefix, wherein the first part of the decrypted prefix comprises multiple elements of the first plurality of elements, the encrypted prefix comprises a second plurality of elements, and the first part of the encrypted prefix comprises multiple elements of the second plurality of elements;
apply a second cipher to a given element of the first plurality of elements, wherein applying the second cipher comprises:
combining multiple elements of the second plurality of elements to form a concatenation of the multiple elements representing a tweak index;
combining the tweak index and a key to form a second index;
selecting a permutation of a block cipher based on the second index; and
encrypting the given element of the first plurality of elements based on the second index; and
process the query based on the encrypted prefix.

16. The non-transitory machine readable storage medium of claim 15, wherein the instructions, when executed by the machine, cause the machine to:
combine the multiple elements of the second plurality of elements and the encrypted given element to form another concatenation representing another tweak index;
combine the another tweak index with a key to form a fourth index; and
encrypt another given element of the first plurality of elements.

17. The non-transitory machine readable storage medium of claim 15, wherein the instructions, when executed by the machine, cause the machine to:

associate a first key with the first cipher;
associate a second key different from the first key with the second cipher.

18. The non-transitory machine readable storage medium of claim 17, wherein the instructions, when executed by the machine, cause the machine to:
receive a key;
generate the first key based on a hash of the received key; and
generate the second key based on the hash of the first key.

19. The non-transitory machine readable storage medium of claim 15, wherein the first cipher comprises a first block cipher associated with a first block size, and the block cipher having the permutation selected based on the second index is associated with a second block size smaller than the first block size.

\* \* \* \* \*